US012741814B2

(12) United States Patent
Bao et al.

(10) Patent No.: US 12,741,814 B2
(45) Date of Patent: Sep. 22, 2026

(54) PALLET LIFTING RACK AND PALLET HANDLING SYSTEM

(71) Applicants: TE Connectivity Services GmbH, Schaffhausen (CH); Tyco Electronics (Shanghai) Co., Ltd., Shanghai (CN)

(72) Inventors: Xianghao (Jorge) Bao, Shanghai (CN); Lei (Alex) Zhou, Shanghai (CN); Dandan (Emily) Zhang, Shanghai (CN); Rong Zhang, Shanghai (CN); Roberto Francisco-Yi Lu, Bellevue, WA (US); Ming (Reuben) Ni, Shanghai (CN); Lei (Leo) Yang, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 752 days.

(21) Appl. No.: 18/072,986

(22) Filed: Dec. 1, 2022

(65) Prior Publication Data

US 2023/0166910 A1 Jun. 1, 2023

(30) Foreign Application Priority Data

Dec. 1, 2021 (CN) ........................ 202111451320.5

(51) Int. Cl.

| | |
|---|---|
| ***B66F 9/06*** | (2006.01) |
| ***B65G 1/02*** | (2006.01) |
| ***B65G 1/06*** | (2006.01) |
| ***B66F 9/07*** | (2006.01) |
| ***B66F 9/075*** | (2006.01) |

(52) U.S. Cl.
CPC ............. *B65G 1/065* (2013.01); *B65G 1/026* (2013.01); *B66F 9/063* (2013.01); *B66F 9/0755* (2013.01)

(58) Field of Classification Search
CPC ......... B65G 1/065; B65G 1/026; B66F 9/063; B66F 9/0755
See application file for complete search history.

(56) References Cited

U.S. PATENT DOCUMENTS

| | | | | |
|---|---|---|---|---|
| 10,968,051 | B1 * | 4/2021 | Tomasetta | B25J 9/0024 |
| 11,084,410 | B1 * | 8/2021 | Bhaskaran | B66F 17/00 |
| 11,584,589 | B2 * | 2/2023 | Zheng | G06Q 10/087 |
| 12,116,204 | B2 * | 10/2024 | Wang | B65G 1/0435 |
| 12,214,978 | B1 * | 2/2025 | Smith | B65G 1/065 |
| 12,312,173 | B2 * | 5/2025 | Liu | B66F 9/122 |

(Continued)

FOREIGN PATENT DOCUMENTS

| | | | | |
|---|---|---|---|---|
| CN | 201218774 Y | * | 4/2009 | G01M 7/08 |

*Primary Examiner* — Saul Rodriguez
*Assistant Examiner* — Ashley K Romano
(74) *Attorney, Agent, or Firm* — Barley Snyder

(57) ABSTRACT

A pallet lifting rack includes a pair of lifting devices. Each of the lifting devices has a frame, a movable bracket mounted on the frame and movable in a vertical direction relative to the frame, a support member connected to the movable bracket, and a driving device driving the movable bracket and the support member to move along the vertical direction. The support members of the pair of lifting devices support a bottom surface of a pallet from a pair of sides of the pallet, so that the pallet is supported on the support members and movable to different height positions in the vertical direction by the support members.

20 Claims, 7 Drawing Sheets

(56) References Cited

U.S. PATENT DOCUMENTS

| | | | | |
|---|---|---|---|---|
| 2006/0255950 | A1* | 11/2006 | Roeder | G06K 7/10336 340/572.7 |
| 2007/0138287 | A1* | 6/2007 | Lombardi | B66F 9/0755 235/462.13 |
| 2015/0102274 | A1* | 4/2015 | He | B66F 9/08 254/2 C |
| 2019/0023492 | A1* | 1/2019 | Voloskov | B65G 1/0492 |
| 2020/0255272 | A1* | 8/2020 | Ruhland | B66F 9/184 |
| 2020/0277137 | A1* | 9/2020 | Bastian | B66F 9/065 |
| 2022/0055876 | A1* | 2/2022 | Bangalore Srinivas | B66F 9/122 |
| 2022/0089419 | A1* | 3/2022 | Kim | G05D 1/247 |
| 2022/0267131 | A1* | 8/2022 | Magzimof | B66F 17/003 |
| 2022/0315338 | A1* | 10/2022 | Malhotra | B65G 1/1373 |
| 2022/0332506 | A1* | 10/2022 | Liu | B25J 15/0014 |
| 2023/0011746 | A1* | 1/2023 | Turco | B65G 1/0492 |
| 2023/0069056 | A1* | 3/2023 | Zahdeh | B66F 9/063 |
| 2023/0073191 | A1* | 3/2023 | Ito | B65G 47/905 |
| 2023/0113731 | A1* | 4/2023 | Stutz | G06Q 10/06313 700/216 |
| 2023/0159274 | A1* | 5/2023 | Liu | B25J 5/007 700/214 |
| 2023/0202755 | A1* | 6/2023 | Liu | G06Q 10/08 700/214 |
| 2023/0206174 | A1* | 6/2023 | Li | B65G 1/1378 705/28 |
| 2024/0067510 | A1* | 2/2024 | Ulbrich | B66F 9/063 |
| 2024/0067511 | A1* | 2/2024 | Gebhardt | B65G 1/0492 |
| 2024/0075615 | A1* | 3/2024 | Verma | B25J 5/007 |
| 2024/0144742 | A1* | 5/2024 | Burns | G07C 5/02 |
| 2024/0165819 | A1* | 5/2024 | Li | B65G 1/0421 |
| 2024/0375871 | A1* | 11/2024 | Zhang | B07C 3/00 |
| 2025/0051152 | A1* | 2/2025 | Zhang | B66F 9/063 |
| 2025/0145435 | A1* | 5/2025 | Del Mar | B66F 9/12 |

* cited by examiner

PALLET LIFTING RACK AND PALLET HANDLING SYSTEM

CROSS-REFERENCE TO RELATED APPLICATION

This application claims the benefit of the filing date under 35 U.S.C. § 119(a)-(d) of Chinese Patent Application No. 202111451320.5, filed on Dec. 1, 2021.

FIELD OF THE INVENTION

The present invention relates to a pallet lifting rack and a pallet handling system including the pallet lifting rack.

BACKGROUND

Especially in the logistics and warehousing industry, it is often necessary to carry pallets for loading goods. Usually, the handling of pallets is done manually. For example, when an automatic guided vehicle (AGV) transports the pallets to a predetermined position, workers need to manually unload the pallets from the AGV and transfer the pallets to the warehouse through trailers and other equipment. This process increases labor costs, and the unloading and handling efficiency of the pallets is very low, which cannot adapt to the efficiency demands of the logistics and warehousing industry.

SUMMARY

A pallet lifting rack includes a pair of lifting devices. Each of the lifting devices has a frame, a movable bracket mounted on the frame and movable in a vertical direction relative to the frame, a support member connected to the movable bracket, and a driving device driving the movable bracket and the support member to move along the vertical direction. The support members of the pair of lifting devices support a bottom surface of a pallet from a pair of sides of the pallet, so that the pallet is supported on the support members and movable to different height positions in the vertical direction by the support members.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
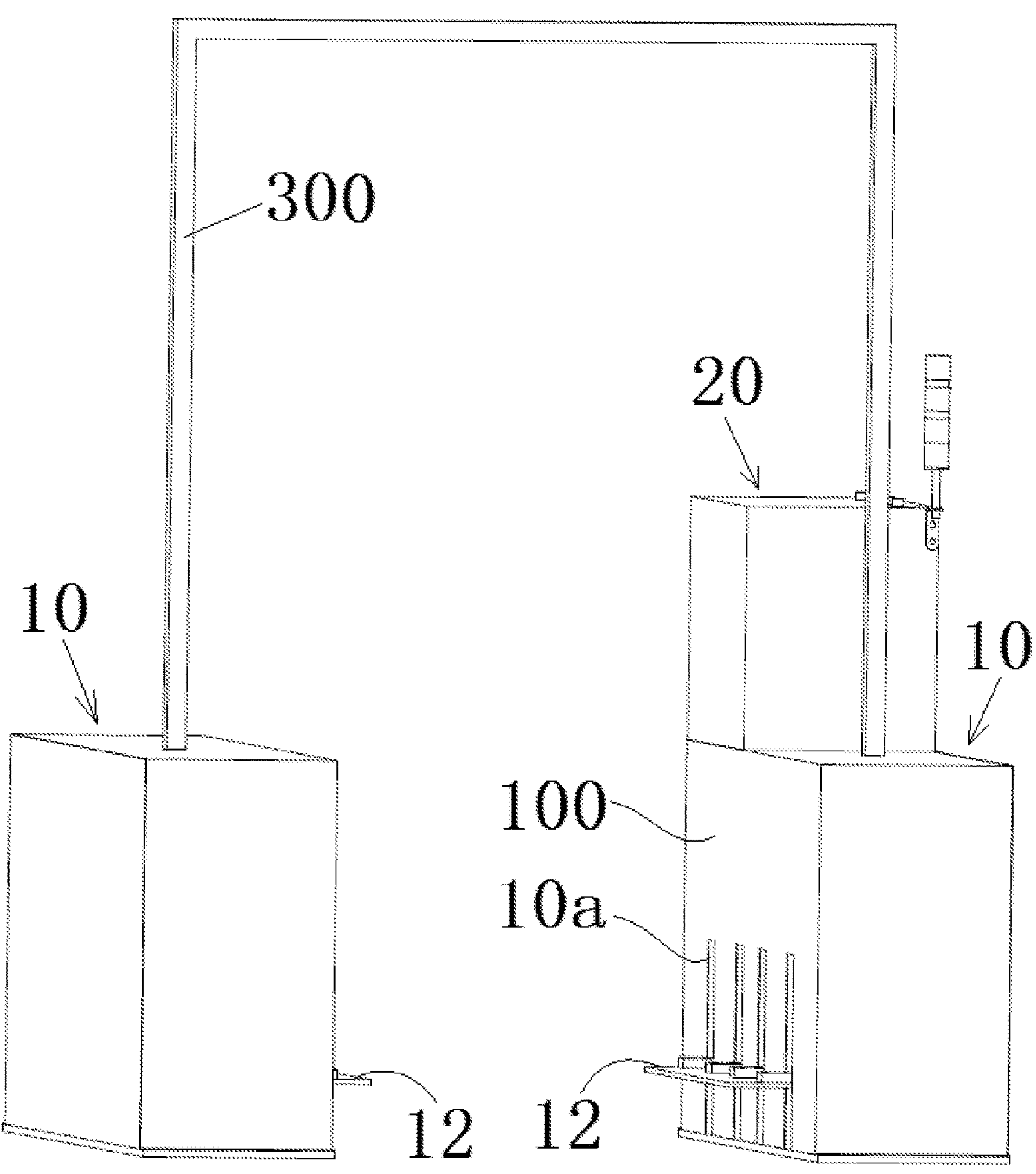
FIG. 1 is a perspective view of a pallet lifting rack according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
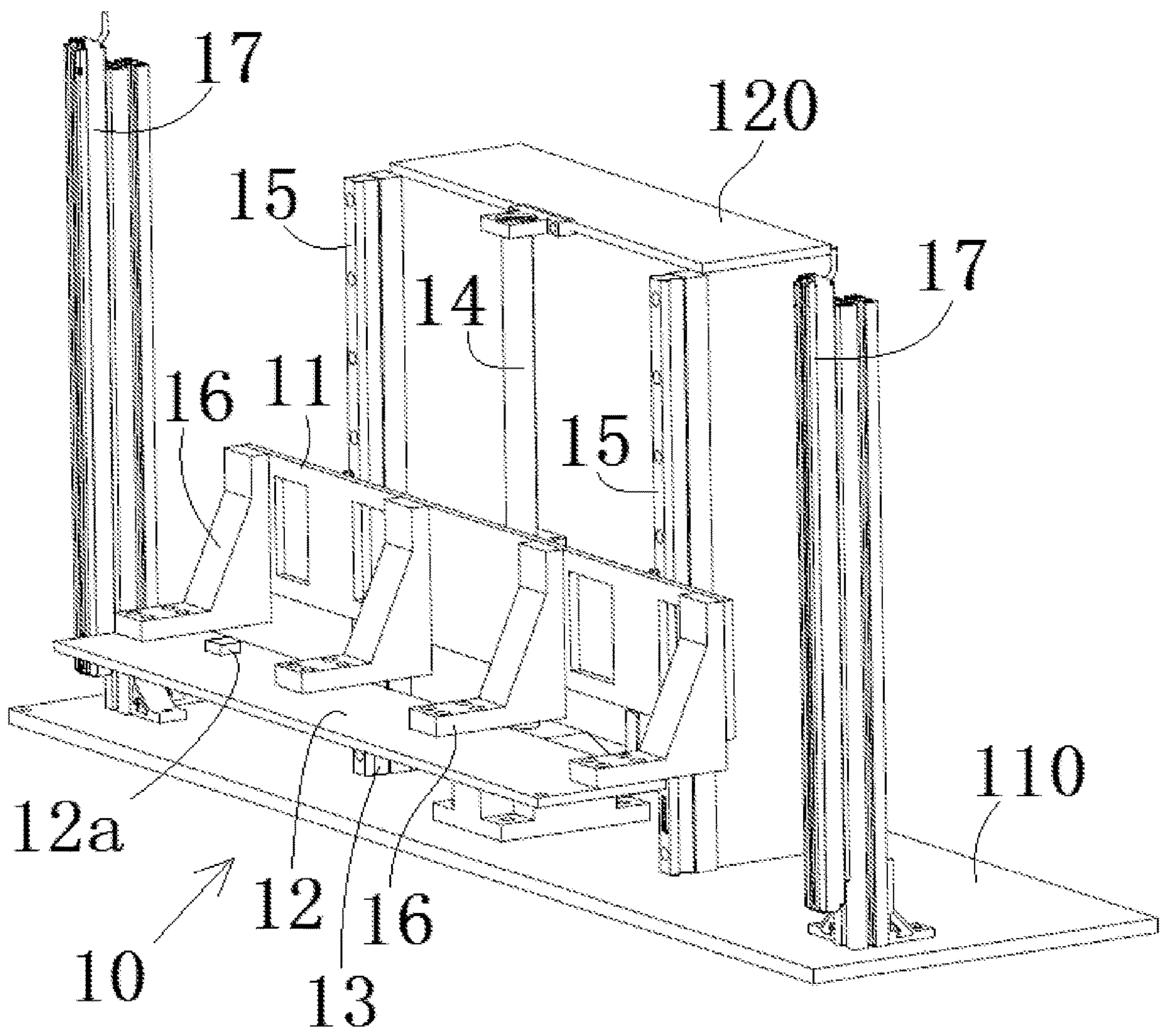
FIG. 2 is a perspective view of a lifting device of the pallet lifting rack in which a housing is removed, viewed from a side.
Figure 3:
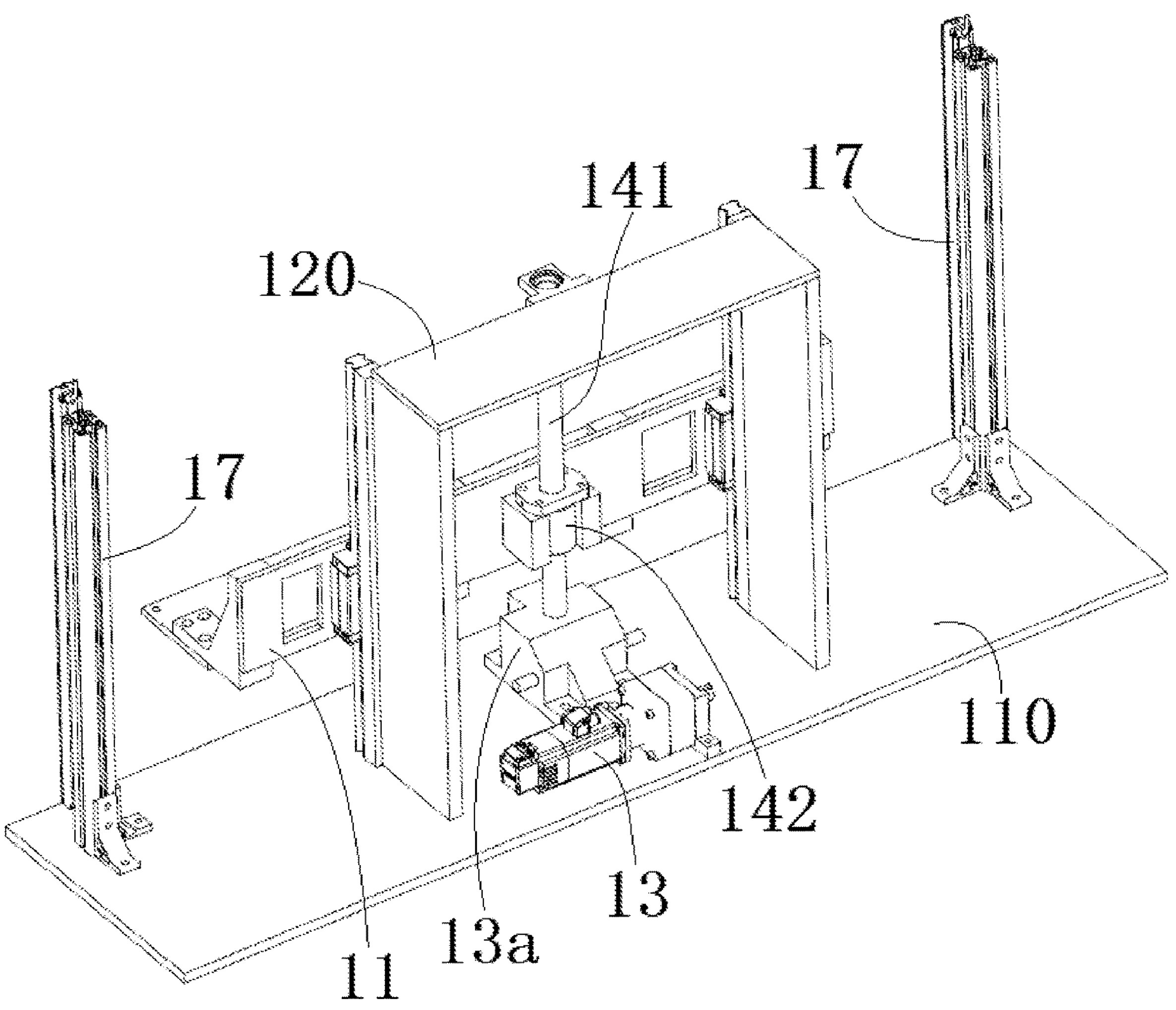
FIG. 3 is a perspective view of the lifting device with the housing removed, viewed from another side.

FIG. 1 shows an illustrative perspective view of a pallet lifting rack according to an exemplary embodiment of the present invention. FIG. 2 shows an illustrative view of a lifting device 10 of the pallet lifting rack shown in FIG. 1 when viewed from one side, in which a housing 100 is removed. FIG. 3 shows an illustrative view of a lifting device 10 of the pallet lifting rack shown in FIG. 1 when viewed from another side, in which the housing 100 is removed.

As shown in FIG. 1, in the illustrated embodiment, the pallet lifting rack includes a pair of lifting devices 10. Each lifting device 10, as shown in FIGS. 2 and 3, includes a frame 120, a movable bracket 11, a support member 12, and a driving device 13 and 14. The movable bracket 11 is movably mounted on the frame 120 and can be moved in a vertical direction relative to the frame 120. The support member 12 is connected to the movable bracket 11. The driving device 13 and 14 is used to drive the movable bracket 11 and the support member 12 to move together in the vertical direction.

Figure 4:
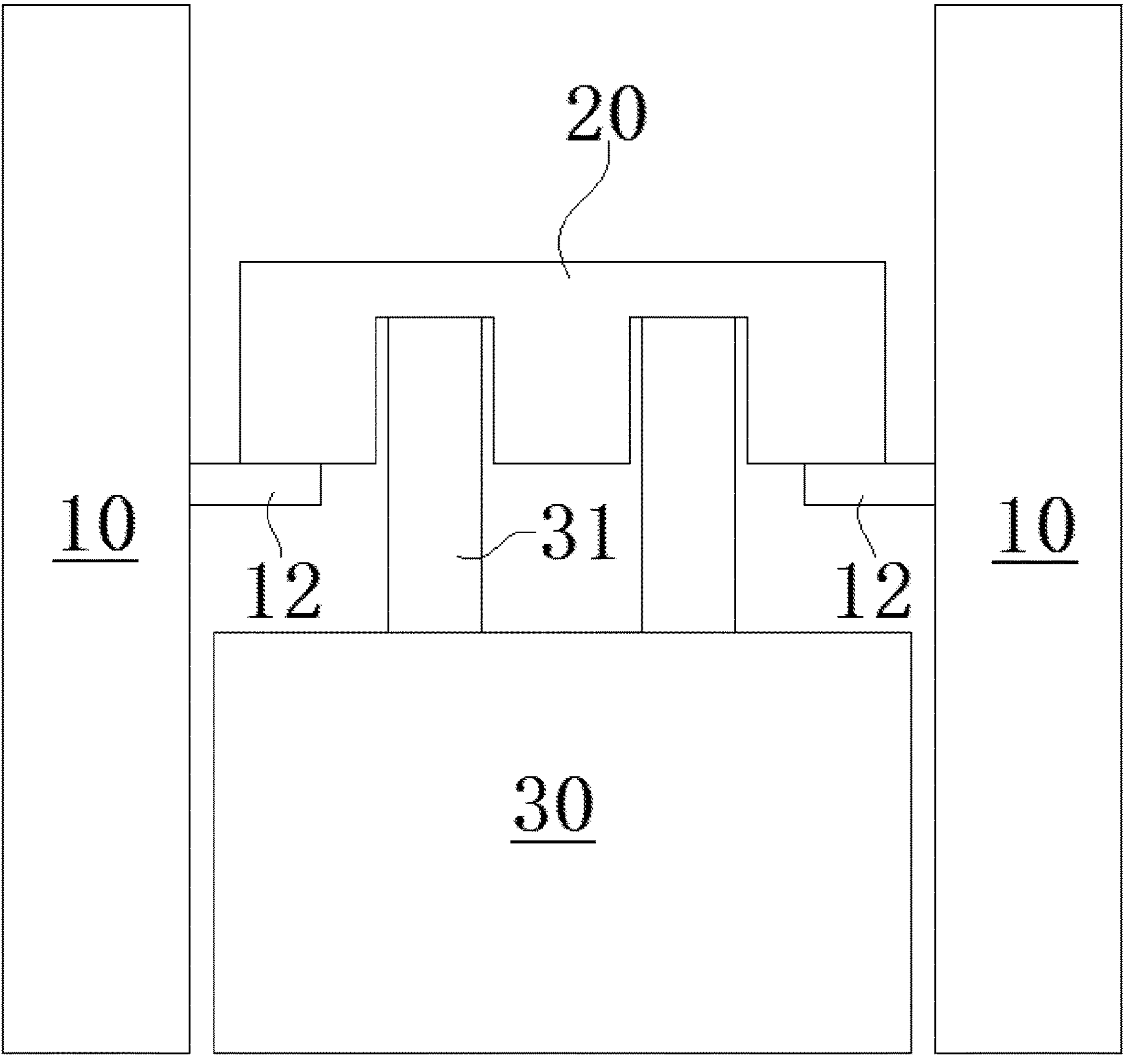
FIG. 4 is a schematic diagram of a pallet handling system according to an embodiment, in which an automatic guided vehicle enters the pallet lifting rack and unloads the pallet on the support member of the pallet lifting rack.
Figure 5:
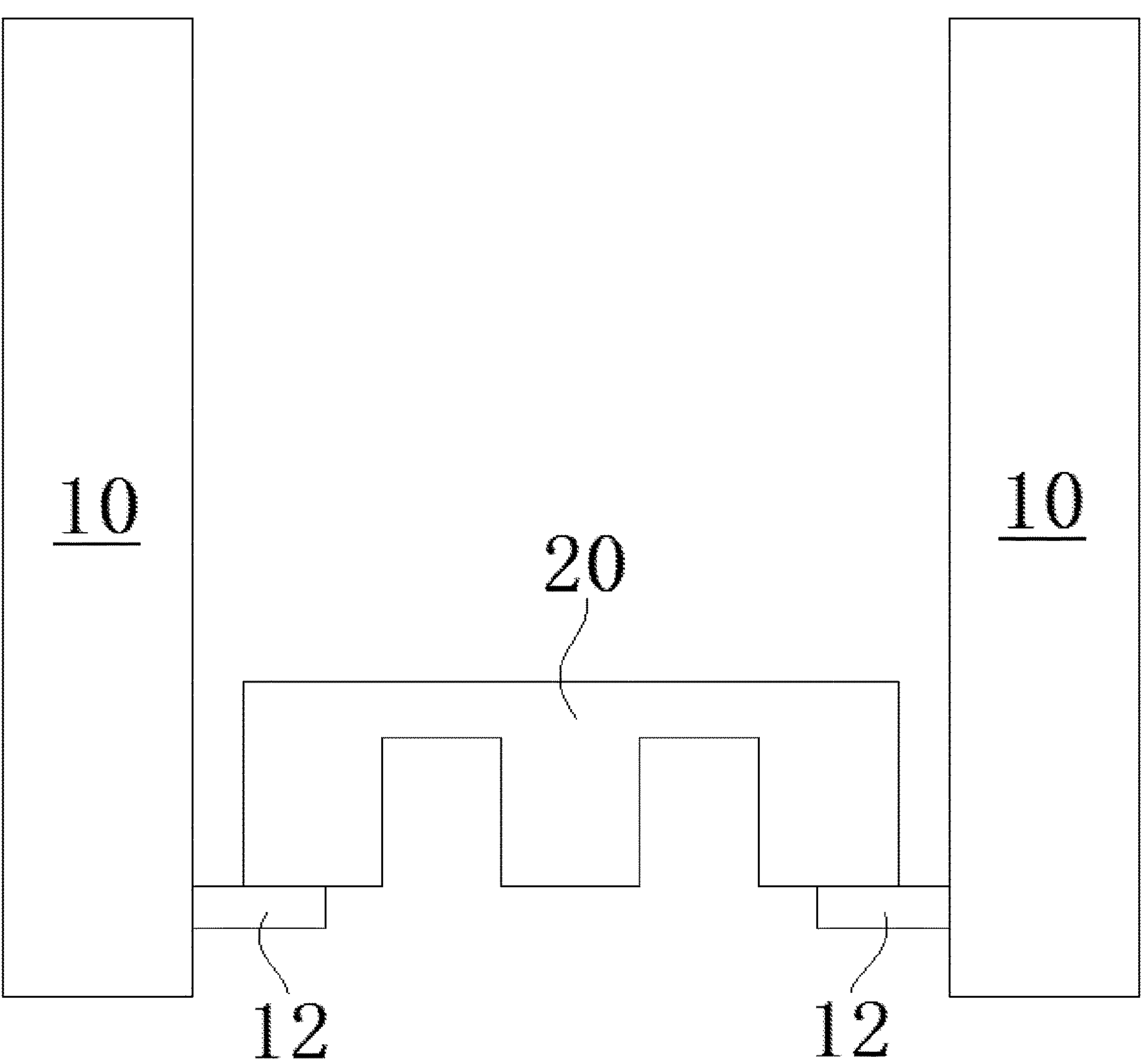
FIG. 5 is a schematic diagram of the pallet handling system, in which the automatic guided vehicle completes the unloading of the pallet and moves away from the pallet lifting rack.

FIG. 4 shows an illustrative view of a pallet handling system according to an exemplary embodiment of the present invention, in which an automatic guided vehicle 30 enters the pallet lifting rack and unloads a pallet 20 on the support member 12 of the pallet lifting rack. FIG. 5 shows an illustrative view of a pallet handling system according to an exemplary embodiment of the present invention, in which the automatic guided vehicle 30 completes the unloading of the pallet 20 and moves away from the pallet lifting rack.

As shown in FIGS. 4 and 5, in the illustrated embodiment, the support members 12 of the pair of lifting devices 10 are configured to support the bottom surface of the pallet 20 from both sides of the pallet 20, so that the pallet 20 can be supported on the support members 12 and can be moved to different height positions by the support member 12.

Each lifting device 10 further comprises a pair of vertical guide rails 15, as shown in FIG. 2. The pair of vertical guide rails 15 are fixed to the frame 120. The movable bracket 11 is slidably mounted on the pair of vertical guide rails 15 so that it can be moved up and down along the pair of vertical guide rails 15.

The driving device 13 and 14 includes a servo motor 13 and a transmission device 14. The transmission device 14 is connected between the drive shaft of the servo motor 13 and the movable bracket 11.

As shown in the embodiment of FIGS. 2 and 3, the transmission device 14 is a ball screw mechanism. The transmission device 14 includes a screw 141 and a nut 142 threaded to the screw 141. The drive shaft of the servo motor 13 is connected to the screw 141 and the nut 142 is connected to the movable bracket 11. When the drive shaft of the servo motor 13 drives the screw 141 to rotate, the screw 141 drives the nut 142 and the movable bracket 11 to move in the vertical direction.

As shown in FIG. 3, in the illustrated embodiment, each lifting device 10 further comprises a brake 13*a*, which is installed on the drive shaft of the servo motor 13 to brake the drive shaft of the servo motor 13 in case of power failure, so that the support member 12 can be reliably maintained at its current position in case of power failure.

In the shown embodiment, the movable bracket 11 and the support member 12 are two parts formed separately, and the support member 12 is detachably connected to the movable bracket 11 through a plurality of L-shaped connection members 12*a*. However, please note that the present invention is not limited to the illustrated embodiment. For example, in another exemplary embodiment of the present invention, the movable bracket 11 and the support member 12 may be formed into a single integral piece.

Each lifting device 10 further comprises a housing 100 in the shown embodiment. The movable bracket 11, the frame 120, and the driving device 13, 14 are accommodated in the housing 100. The support member 12 is arranged outside the housing 100, as shown in FIG. 1. A plurality of avoidance slots 10*a* extending in the vertical direction are formed on the side wall of the housing 100, and the plurality of avoidance slots 10*a* are used to avoid the plurality of L-shaped connection members 12*a*, respectively, so that the plurality of L-shaped connection members 12*a* can be moved up and down in the vertical direction. The length of the avoiding slots 10*a* determines the maximum moving distance of the support member 12 in the vertical direction. Therefore, the length of the avoiding slot 10*a* needs to be reasonably set according to the actual needs.

As shown in FIG. 1, in the illustrated embodiment, the pallet lifting rack further comprises a control device 20, which can be installed on the outer wall of the housing 100 of a lifting device 10. The control device 20 includes a PLC controller for controlling the driving device 13 and 14 and a wireless communication module for communicating with the automatic guided vehicle 30.

As shown in FIG. 1, in the illustrated embodiment, the pallet lifting rack further comprises a wiring pipe 300, and both ends of the wiring pipe 300 are respectively connected to the top wall of the housing 100 of the pair of lifting devices 10. The lifting device 10 includes a cable electrically connected to the control device 20, and the wiring pipe 300 is used to guide the cable to travel along a predetermined path.

As shown in FIGS. 2 and 3, in the illustrated embodiment, the pallet lifting rack further comprises a safety light curtain device 17, which is arranged in the housing 100 of the lifting device 10 to detect whether an object (such as a person or an automatic guided vehicle 30) enters the channel between the pair of lifting devices 10 during the process of moving the support member 12. In the process of moving the support member 12, if the safety light curtain device 17 detects an object entering the channel, the control device 20 controls the servo motor 13 to stop immediately. In this way, accidents can be avoided. The safety light curtain device 17 includes a light transmitter and a light receiver. The light transmitter is mounted on one of the pair of lifting devices 10 for transmitting scanning light to the light receiver. The light receiver is installed on the other of the pair of lifting devices 10 to receive the scanning light emitted by the light transmitter.

As shown in FIG. 2, in the illustrated embodiment, the pallet lifting rack further comprises a sensor 16, which is installed on the support member 12 to detect whether there is the pallet 20 supported on the support member 12.

As shown in FIGS. 1 to 5, in the illustrated embodiment, the support member 12 is a support plate, and the pallet 20 is adapted to be supported on the support plate. However, the present invention is not limited to the illustrated embodiment. For example, the support member 12 may include a row of support rollers on which the pallet 20 is adapted to be supported. In this example, the pallet 20 supported on the support rollers can easily moved on the support member 12.

In the shown embodiment, each lifting device 10 further comprises a base 110, as shown in FIGS. 2 and 3. The frame 120, the servo motor 13 and the safety light curtain device 17 are fixed on the base 110. The frame 120, the driving device 13, 14 and the safety light curtain device 17 are accommodated in the housing 100. The housing 100 may include only four side walls and one top wall. The bottom of the four side walls of the housing 100 is connected to the periphery of the base 110.

As shown in FIG. 4 and FIG. 5, in an exemplary embodiment of the present invention, a pallet handling system is disclosed, which includes the aforementioned pallet lifting rack and automatic guided vehicle 30. The automatic guided vehicle 30 is suitable for moving into the channel between a pair of lifting devices 10 of the pallet lifting rack. The automatic guided vehicle 30 is used to load the pallet 20 and unload the loaded pallet 20 onto the support member 12 of a pair of lifting devices 10.

As shown in FIG. 4, a support device 31 that can be automatically lifted and lowered is arranged on the top surface of the vehicle body of the automatic guided vehicle 30, and the pallet 20 is adapted to be loaded on the support device 31. Before the automatic guided vehicle 30 enters the channel between the pair of lifting devices 10, the support device 31 of the automatic guided vehicle 30 is raised to a position higher than the support member 12 of the lifting device 10. In this way, when the automatic guided vehicle 30 enters the channel between the pair of lifting devices 10, the pallet 20 will not collide with the support member 12.

During the unloading of the pallet 20, the support device 31 of the automatic guided vehicle 30 gradually descends to place the pallet 20 on the support members 12 of the lifting devices 10. After the pallet 20 is unloaded onto the support members 12 of the lifting devices 10, as shown in FIG. 5, the automatic guided vehicle 30 can move away from the pallet lifting rack, and then the pallet lifting rack can move the pallet 20 to a suitable height position for subsequent handling operations.

Before the automatic guided vehicle 30 enters the channel between the pair of lifting devices 10, the support members 12 of the lifting devices 10 are moved to a position higher than the top surface of the automatic guided vehicle 30 to allow the automatic guided vehicle 30 to enter the channel between the pair of lifting devices 10.

Figure 6:
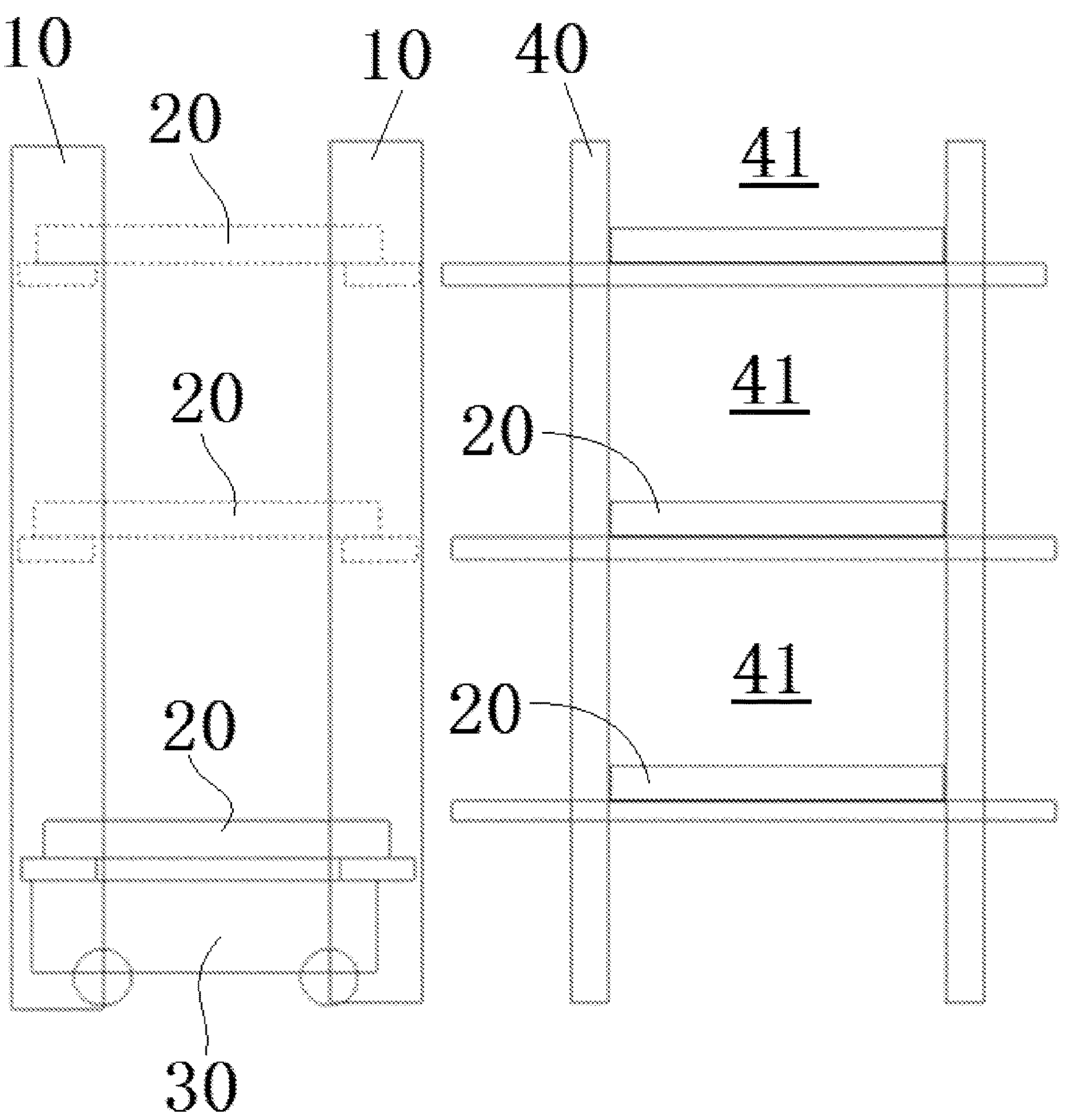
FIG. 6 is a schematic diagram of a pallet handling system according to another embodiment.

FIG. 6 shows an illustrative view of a pallet handling system according to another exemplary embodiment of the present invention. Compared with the pallet handling system shown in FIG. 4-5, the pallet handling system shown in FIG. 6 further comprises a storage system 40. The storage system 40 includes multi-layer storage units 41 at different heights. The support members 12 of the lifting devices 10 can be moved to a height position flush with one layer of the storage unit 41, so that the pallet 20 can be transferred to one layer of the storage unit 41 through the pallet lifting rack.

Figure 7:
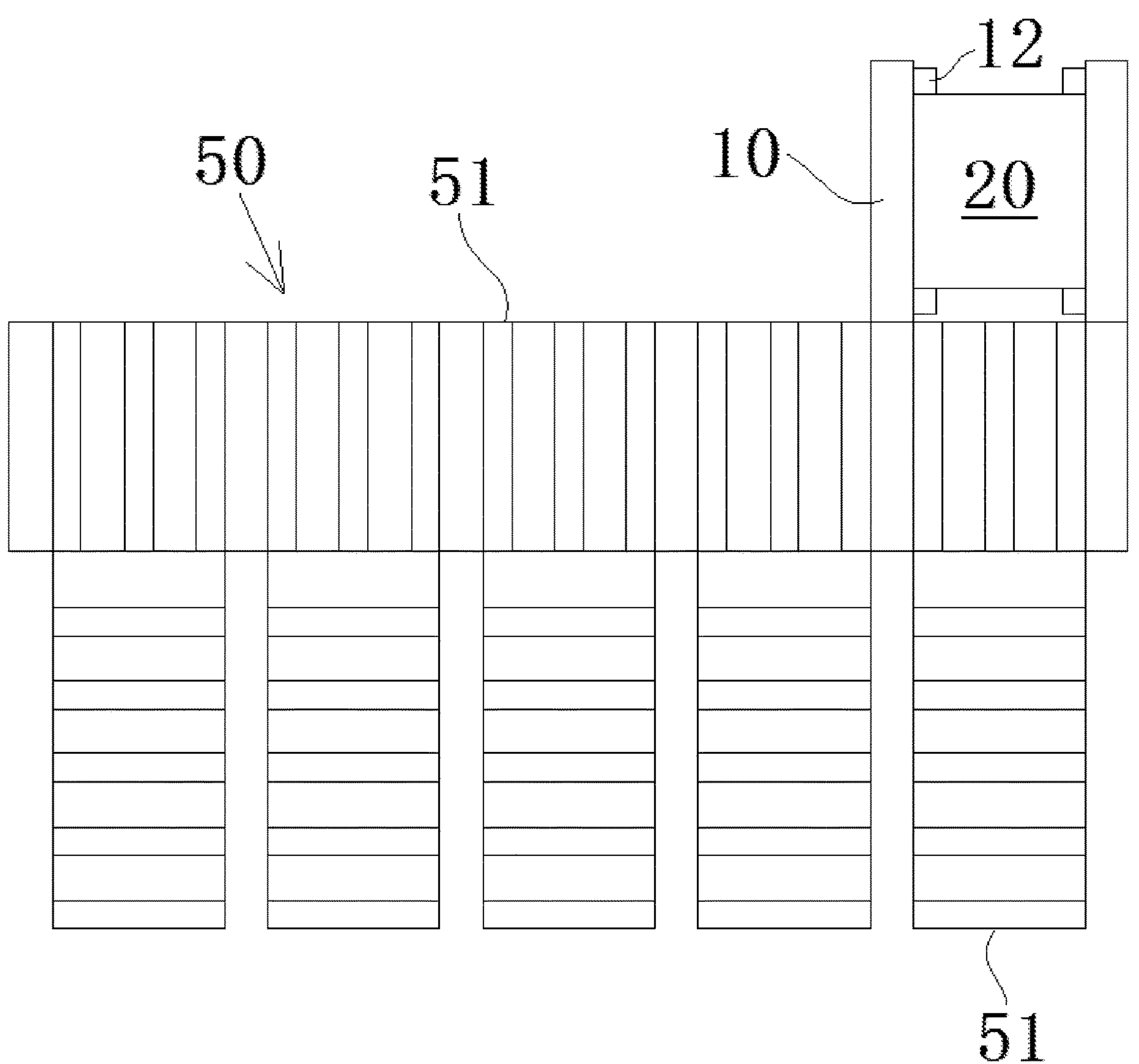
FIG. 7 is a perspective view of a pallet handling system according to another embodiment.

FIG. 7 shows an illustrative view of a pallet handling system according to another exemplary embodiment of the present invention. As shown in FIG. 7, in the illustrated embodiment, the pallet handling system includes the aforementioned pallet lifting rack and a sorting system 50. The sorting system 50 includes a roller conveyor 51 for conveying the pallet 20. The support member 12 of the pallet lifting rack can be moved to a height position flush with the roller conveyor 51, so that the pallet 20 can be transported to the support member 12 of the pallet lifting rack by the roller conveyor 51.

In the above-mentioned exemplary embodiments according to the present invention, the pallet lifting rack can automatically move the pallet to different height positions, and it facilitates the handling of the pallet, improves the handling efficiency of the pallet, and reduces the handling cost of the pallet.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A pallet lifting rack, comprising:

a pair of lifting devices, each including:

a frame;

a movable bracket mounted on the frame and movable in a vertical direction relative to the frame;

a support member connected to the movable bracket;

a driving device driving the movable bracket and the support member to move along the vertical direction, the support members of the pair of lifting devices support a bottom surface of a pallet from a pair of sides of the pallet, so that the pallet is supported on the support members and movable to different height positions in the vertical direction by the support members; and a housing accommodating the movable bracket, the frame, and the driving device, the support member is arranged outside the housing.

2. The pallet lifting rack according to claim 1, wherein each lifting device includes a pair of vertical guide rails fixed to the frame, the movable bracket is slidably installed on the pair of vertical guide rails and movable along the pair of vertical guide rails.

3. The pallet lifting rack according to claim 1, wherein the driving device includes a servo motor and a transmission device connected between a drive shaft of the servo motor and the movable bracket.

4. The pallet lifting rack according to claim 3, wherein the transmission device is a ball screw mechanism that includes a screw and a nut threaded with the screw, the nut is connected to the movable bracket, and the servo motor drives the screw to rotate, the screw drives the nut and the movable bracket to move along the vertical direction when the servo motor drives the screw to rotate.

5. The pallet lifting rack according to claim 3, wherein each lifting device includes a brake installed on the drive shaft of the servo motor and braking the drive shaft of the servo motor in case of power failure, the support member is held at a current position in case of power failure.

6. The pallet lifting rack according to claim 3, wherein each lifting device includes a base on which the frame and the servo motor are fixed.

7. The pallet lifting rack according to claim 1, wherein the movable bracket and the support member are formed into a single integral piece.

8. The pallet lifting rack according to claim 1, wherein the movable bracket and the support member are two pieces formed separately, and the support member is detachably connected to the movable bracket through a plurality of L-shaped connection members.

9. The pallet lifting rack according to claim 8, wherein a plurality of avoidance slots extending along the vertical direction are formed on a side wall of the housing, the plurality of avoidance slots allow the plurality of L-shaped connection members to be moved up and down along the vertical direction.

10. The pallet lifting rack according to claim 1, further comprising a control device including a PLC controller controlling the driving device and a wireless communication module.

11. The pallet lifting rack according to claim 10, further comprising a safety light curtain device detecting whether an object enters a channel between the pair of lifting devices during movement of the support member, and in moving the support member, if the safety light curtain device detects an object entering the channel, the control device controls the driving device to stop.

12. The pallet lifting rack according to claim 11, wherein the safety light curtain device includes a light transmitter mounted on one of the pair of lifting devices and emitting a scanning light and a light receiver installed on the other of the pair of lifting devices and receiving the scanning light.

13. The pallet lifting rack according to claim 1, further comprising a sensor installed on the support member and detecting whether the pallet is supported on the support member.

14. The pallet lifting rack according to claim 1, wherein:

the support member is a support plate and the pallet is supported on the support plate, or the support member has a row of support rollers and the pallet is supported on the support rollers.

15. The pallet lifting rack according to claim 1, further comprising a wiring pipe, a pair of ends of the wiring pipe are respectively connected to top walls of the housings of the pair of lifting devices, each lifting device includes a cable electrically connected to a control device, the wiring pipe guides the cable along a predetermined path.

16. A pallet handling system, comprising:

a pallet lifting rack and a housing, the pallet lifting rack includes a pair of lifting devices each having a frame, a movable bracket mounted on the frame and movable in a vertical direction relative to the frame, a support member connected to the movable bracket, and a driving device driving the movable bracket and the support member to move along the vertical direction, the support members of the pair of lifting devices support a bottom surface of a pallet from a pair of sides of the pallet, so that the pallet is supported on the support members and movable to different height positions in the vertical direction by the support members, the housing accommodates the movable bracket, the frame, and the driving device, the support member is arranged outside the housing; and an automatic guided vehicle movable into a channel between the pair of lifting devices, the automatic guided vehicle loads the pallet and unloads the pallet onto the support members.

17. The pallet handling system according to claim 16, wherein the automatic guided vehicle includes a vehicle body and a support device provided on a top surface of the vehicle body, the support device is lifted and lowered automatically, the pallet is loaded on the support device, the support device is raised to a position higher than the support members before the automatic guided vehicle enters the channel, and in a process of unloading the pallet, the support device descends to place the pallet on the support members.

18. The pallet handling system according to claim 16, wherein, before the automatic guided vehicle enters the channel, the support members of the lifting devices are moved to a position higher than the top surface of the automatic guided vehicle to allow the automatic guided vehicle to move into the channel.

19. The pallet handling system according to claim 16, further comprising a storage system including a plurality of storage units at different heights, the support members are movable to a height position flush with one storage unit to transfer the pallet to the storage unit through the pallet lifting rack.

20. A pallet handling system, comprising:

a pallet lifting rack and a housing, the pallet lifting rack includes a pair of lifting devices each having a frame, a movable bracket mounted on the frame and movable in a vertical direction relative to the frame, a support member connected to the movable bracket, and a driving device driving the movable bracket and the support member to move along the vertical direction, the support members of the pair of lifting devices support a bottom surface of a pallet from a pair of sides of the pallet, so that the pallet is supported on the support members and movable to different height positions in the vertical direction by the support members, the housing accommodates the movable bracket, the frame, and the driving device, the support member is arranged outside the housing; and a sorting system including a roller conveyor that conveys the pallet, the support members are movable to a height position flush with the roller conveyor to transfer the pallet to the support members by the roller conveyor.

* * * * *